United States Patent Office 3,353,175
Patented Nov. 14, 1967

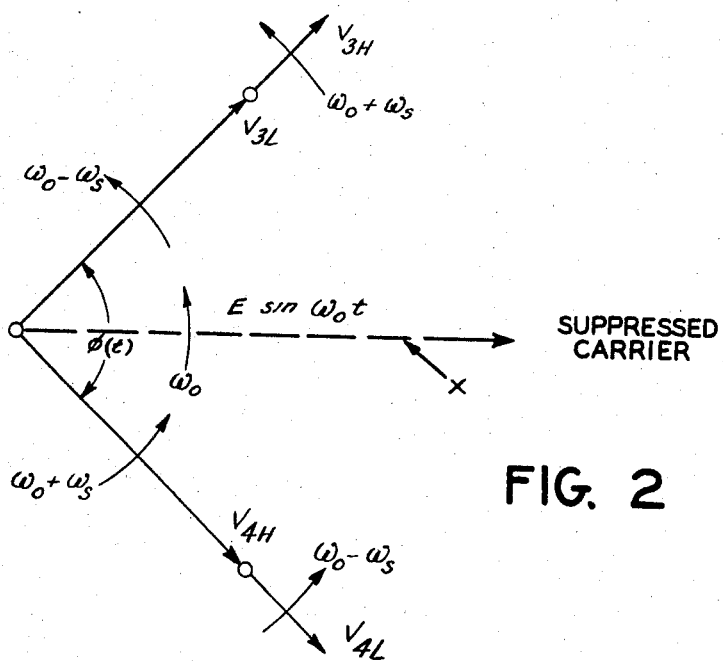
FIG. 2
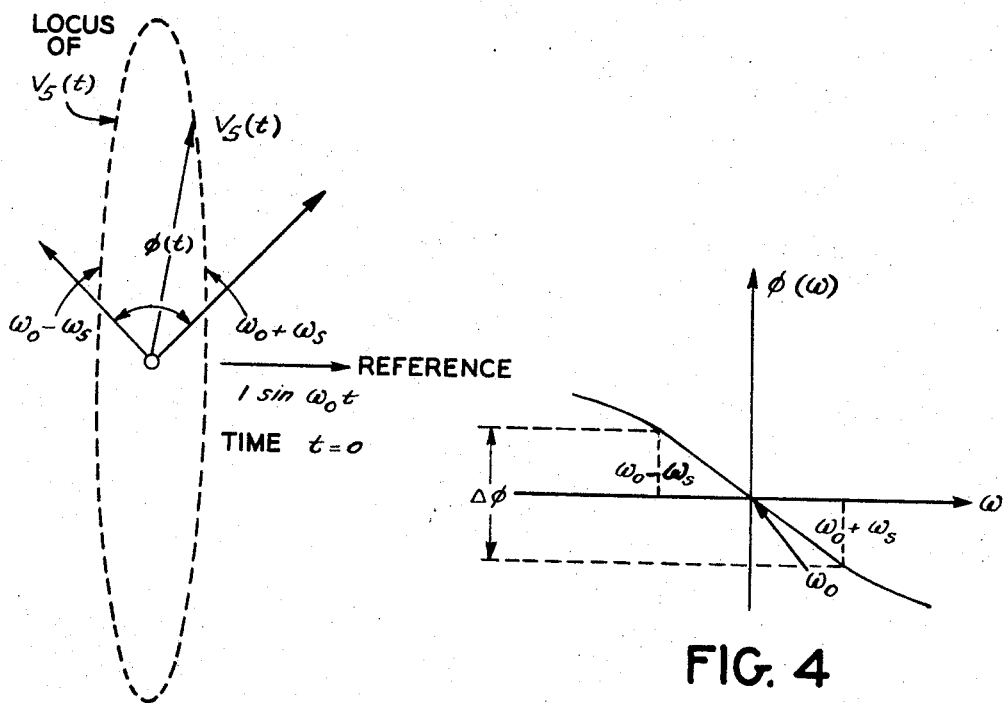
FIG. 3
FIG. 4
INVENTORS
JAMES E. BROOK
FRANK A. HANUSEK
BY Herbert L. Davis
ATTORNEY

3,353,175
RESOLVER INCREMENTAL ENCODER
James E. Brook, Maywood, and Frank A. Hanusek, Wyckoff, N.J., assignors to The Bendix Corporation, Teterboro, N.J., a corporation of Delaware
Filed Aug. 26, 1964, Ser. No. 392,221
10 Claims. (Cl. 340—347)

This invention relates to a resolver incremental encoder and more particularly to an electrical network including a resolver phase shifter operatively connected to serve as an incremental angle encoder to generate quantum angle data of any desired resolution.

The resolver transducer may be considered as an electromechanical modulator which generates suppressed-carrier amplitude modulation. On this basis, a signal analysis has been conducted to determine how shaft information is conveyed through the phase shifter networks. It is found the lag-lead R.C. networks separate the side bands of the suppressed-carrier resolver signals so that these side bands, now existing on separate lines, can be manipulated electronically to achieve the desired result.

Since such shaft information may be effectively carried in a single side band, the processing and extraction of this information is facilitated by frequency multiplication in a system in which the carrer, along with a narrow spectrum for the shaft velocity side band, is multiplied by some integer number to give the desired incremental count for one revolution of the input shaft.

An object of the invention is to provide an incremental encoder system in which a resolver transducer and phase network is operatively connected in the system so as to effectively apply the input shaft information through the system.

Another object of the invention is to provide an incremental encoder in which the resolver transducer, as a mechanical device is extremely sturdy and robust, while as an electrical device, it is completely passive; which factors provide a favorable contrast to the conventional glass disc encoder heretofore in use.

Another object of the invention is to provide a novel resolver transducer and phase network system in which, from the viewpoint of angle metrology, the resolver transducer, insofar as extreme accuracies are concerned, has distinct advantages over a disc encoder type system. The resolver transducer acquires, or observes, weighted angle information on the basis of a distributive coupling around a cylindrical air gap between the rotor and stator elements of the resolver transducer so that as a by-product of the high accuracy obtainable in the resolver transducer, and high resolution resulting from a large frequency multiplication factor, the incremental system may be applied as a tachometer in the so-called "twilight zone" of shaft velocities, which approach zero.

Another object of the invention is to provide a resolver incremental system in which the time integral of phase rate is the encoded quantity.

Another object of the invention is to provide a simple and flexible system for translating a shaft input into an incremental output and including means whereby the shaft velocity of a resolver transducer (or its time integral, angle) may be superimposed upon the angular velocity of a sinusoidal carrier wave through a resolver phase shifter so as to provide two separate side band signals, one side band signal being equivalent to the sum of the shaft velocity and carrier wave frequency and the other side band signal being equivalent to the difference between the shaft velocity and the carrier wave frequency, said side band signals being multiplied by an integer $n$ to yield a count signal equivalent to that of a resolver having $2^n p$ poles so as to provide a resolver incremental encoding system of exceedingly fine resolution.

Another object of the invention is to provide in the aforenoted resolver incremental encoding system means for applying one of the side band signals through a ninety degree (90°) phase shift network and other means for combining the output of the phase shift network with the other side band signal in a beat frequency detector so as to effect a pair of standard incremental signals offset from each other by ninety electrical degrees (90°), these two signals being necessary for direction sense (clockwise or counterclockwise) of the input shaft.

Another object of the invention is to provide in the aforenoted resolver incremental encoding system a pair of Schmitt triggers to square the sinusoidal count signals so as to thereby render the signals into standard incremental form.

Another object of the invention is to provide in the aforenoted resolver incremental encoding system a pair of zero crossing detectors which mark the events of zero crossings by short pulses which pass through a coincidence gate to provide pulses at a zero scale reference to define a zero condition.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 2 is a vectorial representation of the separate side band signals obtained from the outputs of the resolver lag-lead phase shifter.

FIGURE 3 is a vectorial represent showing that the signal $V_5(t)$ traces an ellipse that clearly has both amplitude and phase modulation where the phase angle is referenced against the excitation current $I \sin \omega_0 t$, and that the phase angle between the separate side bands remains unperturbed; this is not apparent in the showing of the separate side bands displayed in FIGURE 2.

FIGURE 4 is a diagrammatical illustration showing that the phase characteristics of the frequency multiplier of FIGURE 1 is a ramp and not flat.

Figure 1:
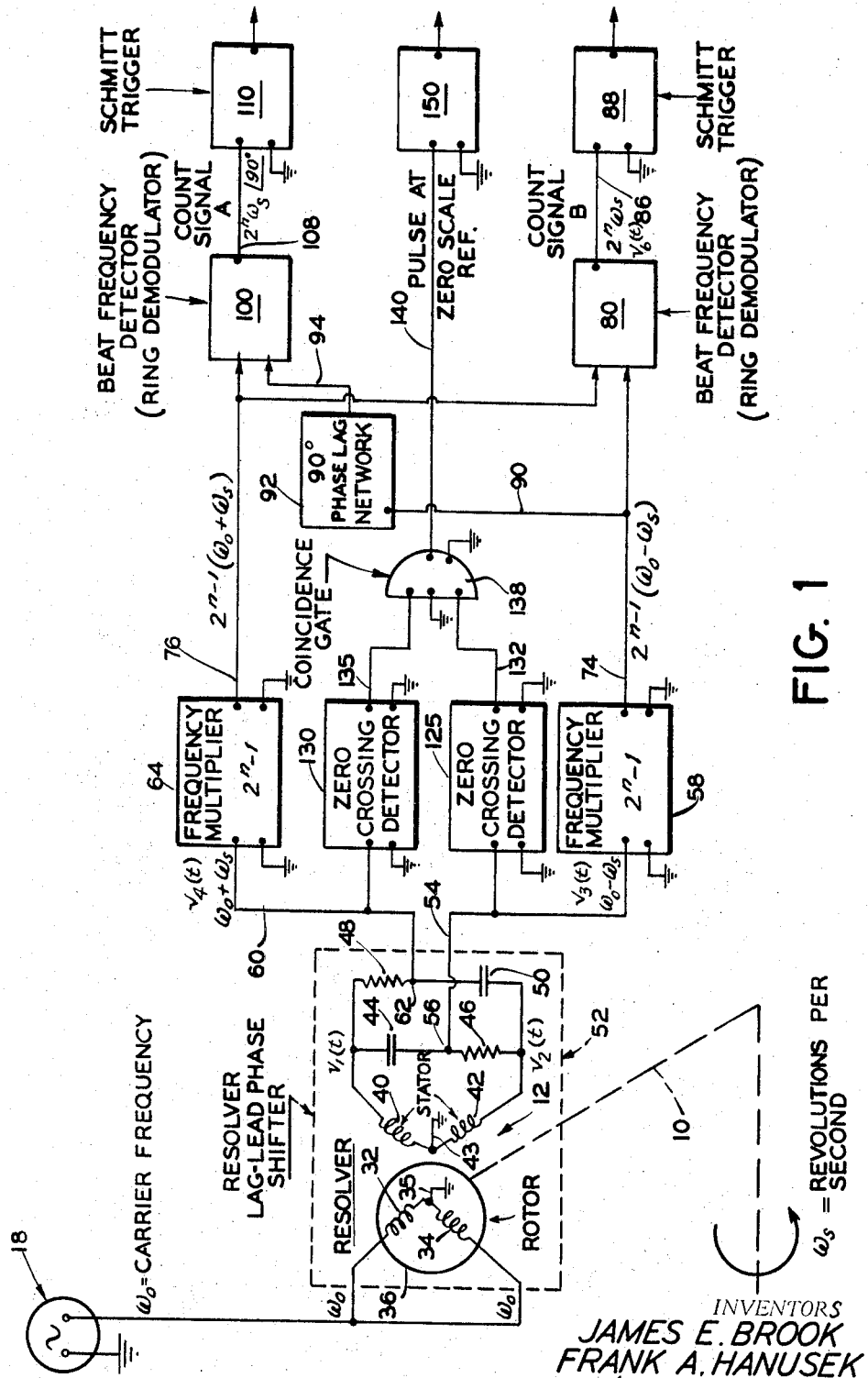
FIGURE 1 is a schematic wiring diagram of an incremental encoder system embodying the present invention.

Referring to the drawing of FIGURE 1, there is illustrated an electronic system which is arranged to transfer the angular input of a shaft 10 of a resolver transducer 12 into incrementally quantized electrical signals of any desired resolution. A two-pole resolver 12 has been shown so as to simplify the presentation, although a multipole resolver may normally be used to implement a practical system where both high accuracy as well as high resolution are desired.

In the drawing of FIGURE 1, there is electrically connected across a source of alternating current 18 a winding 32 and a winding 34, both of which are ground connected at 35 and carried by a rotor element 36 of the resolver 12. The source of alternating current 18 may be of a constant 400 cycle power supply type. The windings 32 and 34 are arranged in spaced quadrature and in cooperative relation with a stator winding 40 and a stator winding 42, both of which are ground connected at 43. The stator windings 40 and 42 are also arranged in spaced quadrature and are inductively coupled to the rotor windings 32 and 34 of the resolver 12, in a variable coupling relation.

There is further provided a lag-lead phase shifter network in which a capacitor 44 and a resistor element 46 are serially connected across the opposite output terminals of the stator windings 40 and 42 of the resolver 12 while a second resistor 48 and capacitor 50 are connected across the aforesaid opposite output terminals of the stator windings 40 and 42 of the resolver 12 so as to constitute a resolver lag-lead phase shifter 52. There is further provided an output line 54 leading from a point 56 intermediate the serially connected capacitor 44 and resistor 46 to an input of a frequency multiplier 58 of a conventional type while another output line 60 leads from a point 62 intermediate the serially connected resistor 48 and capacitor 50 to an input of a frequency multiplier 64 also of a conventional type and identical to the frequency multiplier 58.

The alternating current applied to the rotor windings 32 and 34 of the resolver 12 from the constant source of alternating current 18 is shown in the drawing of FIGURE 1 as represented by the symbol $\omega_0$ which is equal to the carrier angular velocity while the angular velocity imparted to the rotor 36 by the shaft 10 is indicated by the symbol $\omega_s$ as equal to the revolutions per second of the input shaft 10.

Further, the electrical output signals from the resolver lag-lead phase shifter 52 are separate side band sinusoidal signal waves ($\omega_0 \pm \omega_s$) in which the output line 54 has a side band signal wave equal to $\omega_0 - \omega_s$ upon angular movement of the shaft 10 in one sense and a side band signal wave equal to $\omega_0 + \omega_s$ upon angular movement of the shaft 10 in an opposite sense while output line 60 has another side band signal wave equal to $\omega_0 + \omega_s$ upon the angular movement of the shaft 10 in said one sense and a side band signal wave equal to $\omega_0 - \omega_s$ upon the angular movement of the shaft 10 in said opposite sense.

Through the operation of the resolver lag-lead phase shifter 52, the velocity equal to $\omega_s$ of the resolver shaft 10 (or its time integral, angle) is superimposed upon the carrier velocity $\omega_0$ supplied by the source of alternating current 18. Upon the angular movement or rotation of the shaft 10 in the one sense shown in FIGURE 1, the separated side band signals $\omega_0 - \omega_s$ and $\omega_0 + \omega_s$ applied through the output lines 54 and 60, respectively, are then applied to the inputs of identical electronic frequency multipliers 58 and 64 and multiplied by an integer number using techniques common in the communications field and indicated in the multipliers 58 and 64 by the factor $2^{n-1}$. Thus, the multipliers 58 and 64, shown in FIGURE 1, yields signals, which when summed, produce a signal $2^n \omega_s$ equivalent to that of the resolver 12 having $2^{n+1}P$ poles.

The signal applied to output line 74 of the multiplier 58, as shown in FIGURE 1, is equivalent to $2^{n-1}(\omega_0 - \omega_s)$ while the signal applied to the output line 76 of the multiplier 64, as shown in FIGURE 1, is equivalent to $2^{n-1}(\omega_0 + \omega_s)$. These output signals applied to the lines 74 and 76 from the multipliers 58 and 64, respectively, are in turn combined at a beat frequency detector 80 of a type such as a ring demodulator so as to provide at the output line 86 of the beat frequency detector 80 a count signal B shown in FIGURE 1 at the frequency $2^n \omega_s$. The count signal B is in turn applied to a Schmitt trigger 88 of conventional type arranged to square the sinusoidal count signal B so as to thereby render the count signal into standard incremental form.

Further, upon rotation of the shaft 10, in one sense indicated in FIGURE 1, the output signal equivalent to $2^{n-1}(\omega_0 - \omega_s)$ applied at line 74 from the multiplier 58 is connected by an electrical conductor 90 into the input of a conventional ninety-degree phase lag network 92 and through an output line 94 from phase lag network 92 a second beat frequency detector 100 such as a ring demodulator where the phase lagging signal from the network 92 and equivalent to $2^{n-1}(\omega_0 - \omega_s)$ is combined with and will lag in phase the signal equivalent to $2^{n-1}(\omega_0 + \omega_s)$ applied to the line 76 from the output of multiplier 64.

However, upon angular movement or rotation of the shaft 10 in the opposite sense from that indicated at FIGURE 1, then the signals applied at lines 74 and 76 would be in a reverse relation so that the signal applied to line 74 would be equivalent to $2^{n-1}(\omega_0 + \omega_s)$ while the signal applied to line 76 would be equivalent to $2^{n-1}(\omega_0 - \omega_s)$. The signal applied then to output line 94 through the phase lag network 92 from line 74 would be equivalent to $2^{n-1}(\omega_0 + \omega_s)$ and would lag in phase the signal equivalent to $2^{n-1}(\omega_0 - \omega_s)$ which would be applied through line 76 and combined therewith in the second beat frequency detector 100. Thus, whether the signal equivalent to $2^{n-1}(\omega_0 + \omega_s)$ leads or lags the phase of the electrical signal equivalent to $2^{n-1}(\omega_0 - \omega_s)$ would be dependent upon the sense of angular movement of rotation of the shaft 10. The phase relationship of the resultant or combined signal applied to an output line 108 from the beat frequency detector 100 provides an indication of the sense of the angular movement or rotation of the shaft 10 in that signal A at line 108 leads or lags the phase of signal B at line 86 according to the direction of rotation of the shaft 10.

The combined signal from the beat frequency detector 100 is applied as count signal A through the output line 108 to the input of a conventional Schmitt trigger 110 which serves to square the sinusoidal count signal A applied through line 108 so as to thereby render the count signal A into a standard incremental form. While the network 92 is shown as a conventional ninety-degree phase lag network, this network 92 may, of course, be in the form of a ninety-degree phase lead network of conventional type.

The output lines 54 and 60 are further connected to the inputs of identical zero crossing detectors 125 and 130, respectively, which may be of a conventional type arranged to generate to the output lines 132 and 135 electrical pulses upon the passage through zero of sinusoidal signals applied to the inputs thereof. The zero crossing detectors 125 and 130 may be of a type such as disclosed and claimed in a copending U.S. application Ser. No. 392,154, filed Aug. 26, 1964, now abandoned, by James E. Brook, and assigned to The Bendix Corporation.

The output signals applied through the output lines 132 and 135 of the zero crossing detectors 125 and 130 are applied to the input of a coincidence gate 138 of conventional type.

Upon the simultaneous application of the zero crossing pulses from the crossing detectors 125 and 130 to the coincidence gate 138, the gate 138 is rendered effective to apply through an output line 140 an output pulse defining a zero reference position. The coincident gate 138 is thus so rendered effective when the sinusoidal signals applied through the lines 54 and 60 are simultaneously in the zero crossing condition indicated in FIGURE 2 by the suppressed-carrier line X and in which condition, the absolute zero position of the input shaft 10 is so defined.

The zero crossing signal applied then by the zero crossing detectors 125 and 130 to the coincidence gate 138 and thereby to ouput line 140 will in turn be applied to the input of a suitable mechanism 150 for indicating absolute zero.

*Operation*

In the operation of the incremental encoder of the present invention, the resolver phase shifter 52 provides a means to encode angular positions of the shaft 10 by quantizing phase time in the sample data mode. Investigation of the velocity errors inherent in the system has led to a method of correction which places the resolver phase shifter 52 in the purely incremental mode of angle data acquisition.

The resolver transducer 12 and phase networks 44–46 and 48–50, shown by FIGURE 1, may be viewed as an electromechanical modulator, and on this basis, a signal analysis has been conducted to determine how input shaft information is carried through this system.

Considering the resolver 12 from the viewpoint of the modulation process which, in its simplest form, consists of generating an output signal as the product of two input signals (the term, signal, being understood to be a time function). The signals entering the resolver 12 are the excitation current $I_R(t)$ for the rotor windings 32 and 34, and the space angle between the rotor windings 32–34 and the stator windings 40–42, $\theta(t)$. The resolver 12, by definition, is a variable transformer having couplings which vary according to the particular mutual inductance functions:

(1) $\qquad M_1(t) = M \sin \theta(t)$ (2) $\qquad M_2(t) = M \cos \theta(t)$

These mutuals act in concert with the alternating current rotor excitation:

(3) $\qquad I_R(t) = I \sin \omega_0(t)$

The induced voltages in the stator coils 40 and 42 result from the modulation of the carrier Equation 3 by the electromechanical parameters expressed by Equations 1 and 2. These voltages are:

(4) $$v_1(t) = \frac{d}{dt}[M_1(t) I_R(t)]$$

(5) $$v_2(t) = \frac{d}{dt}[M_2(t) I_R(t)]$$

Which after differentiating, become (6) $$v_1(t) = M_1 \left[ \omega_0 \sin \theta(t) \cos \omega_0 t + \frac{d}{dt}\theta(t) \cos \theta(t) \sin \omega_0 t \right]$$

(7) $$v_2(t) = M_1 \left[ \omega_0 \sin \theta(t) \cos \omega_0 t - \frac{d}{dt}\theta(t) \sin \theta(t) \sin \omega_0 t \right]$$

Equations 4 and 5 are general expressions of the fundamental differential equation for electromagnetic induction. Physically, when M is held constant, the equations describe a transformer; and when I is held constant and $\theta(t) = \omega_s t$, they describe a generator. For convenience let the shaft angle time function be the constant velocity $\omega_s$, which converts Equations 6 and 7 into the simpler forms.

(8) $v_1(t) = MI[\omega_0 \sin \omega_s t \cos \omega_0 t + \omega_s \cos \omega_s t \sin \omega_0 t]$ (9) $v_2(t) = MI[\omega_0 \cos \omega_s t \cos \omega_0 t - \omega_s \sin \omega_s t \sin \omega_0 t]$ By application of the identities $$\sin A = \left(A - \frac{\pi}{2}\right), \cos A = \sin \left(A + \frac{\pi}{2}\right)$$

and $$\sin A \sin B = \frac{1}{2} \cos (A-B) - \frac{1}{2} \cos (A+B)$$

Equals 8 and 9 become

(10) $v_1(t) = \frac{1}{2} MI[\omega_0 + \omega_s) \sin (\omega_0 + \omega_s)t$
$\qquad -(\omega_0 - \omega_s) \sin (\omega_0 - \omega_s)t]$

(11) $v_2(t) = \frac{1}{2} MI[j(\omega_0 + \omega_s) \sin (\omega_0 - \omega_s)t$
$\qquad + j(\omega_0 - \omega_s) \sin (\omega_0 - \omega_s)t]$ A further simplification in form may be effected using dimensionless angular velocity to express the high and low side bands. The side bands are defined as

(12) $$u_H = \frac{\omega_0 + \omega_s}{\omega_0}$$

(13) $$u_L = \frac{\omega_0 - \omega_s}{\omega_0}$$

Equations 10 and 11, giving the resolver stator signals for sinusoidal excitation at $\omega_0$ and constant shaft velocity at $\omega_s$, become

(14) $v_1(t) = \frac{1}{2} MI\omega_0 (u_H \sin u_H \omega_0 t - u_L \sin u_L \omega_0 t)$

(15) $v_2(t) = \frac{1}{2} MI\omega_0 (ju_H \sin u_H \omega_0 t + ju_L \sin u_L \omega_0 t)$ The resolver 12 is now connected as a symmetrical lag-lead phase shifter 52, or phase clock, as shown in FIGURE 1.

The stator coils 40 and 42 are assumed to have no self-impedance, and the resistance and capacitance of the R.C. networks 44–46 and 48–50 are chosen to satisfy the relation

(16) $$\omega_0 = \frac{1}{RC}$$

The modulated resolver signals, Equations 14 and 15, are the forcing functions acting on the two linear R.C. networks 44–46 and 48–50. Since two frequencies are present, the components are paired for each frequency to form two separate forcing functions. Superposition of the network solutions for each case gives the solution for $v_3(t)$.

To keep the notation compact the four side bands of Equations 14 and 15 are symbolized as follows:

(17) $\qquad v_{1H} = \frac{1}{2} MI\omega_0 u_H \sin u_H \omega_0 t$

(18) $\qquad v_{2H} = j\frac{1}{2} MI\omega_0 u_H \sin u_H \omega_0 t$

(19) $\qquad v_{1L} = -\frac{1}{2} MI\omega_0 u_L \sin u_L \omega_0 t$

(20) $\qquad v_{2L} = j\frac{1}{2} MI\omega_0 u_L \sin u_L \omega_0 t$

And the side band solutions in double subscript form sum to the complete solutions

(21) $\qquad v_3(t) = V_{3H} + V_{3L}$

(22) $\qquad v_4(t) = v_{4H} + V_{4L}$

The network equations for $V_{3H}$ and $V_{3L}$ are

(23) $$V_{3H} = V_{1H} + \frac{R}{R + \frac{1}{sC}}(V_{2H} - V_{1H})$$

(24) $$V_{3L} = V_{1L} + \frac{R}{R + \frac{1}{sC}}(V_{2L} - V_{1L})$$

Solving for $V_{3H}$ in terms of the high side band $$\omega_0 + \omega_s = u_H \omega_0$$

(25) $$V_{3H} = \frac{1}{2} MI\omega_0 u_H \frac{u_H - 1}{1 + u_H^2}(-1 + ju_H) \sin (\omega_0 + \omega_s)t$$

(26) $$V_{3L} = \frac{1}{2} MI\omega_0 u_L \frac{1 + u_L}{1 + u_L^2}(-1 + ju_L) \sin (\omega_0 - \omega_s)t$$

And finally $v_3(t)$ is obtained as the sum of $V_{3H}$ and $V_{3L}$ according to Equation 21. It is left in component form.

Repeating the process for the solution of $v_4(t)$ results in the components

(27) $$V_{4H} = \frac{1}{2} MI\omega_0 u_H \frac{1 + u_H}{1 + u_H^2}(u_H + j) \sin (\omega_0 + \omega_s)t$$

(28) $$V_{4L} = \frac{1}{2} MI\omega_0 u_L \frac{1 - u_L}{1 + u_L^2}(u_L + j) \sin (\omega_0 + \omega_s)t$$

The output signals created by a constant shaft velocity into the system of FIGURE 3 are completely described by the four side bands expressed in Equations 25, 26, 27 and 28. Two of the side bands, $V_{3H}$ and $V_{4L}$, are vestigial, since they are very small with respect to the principal side bands, $V_{3L}$ and $V_{4H}$, when $\omega_0 \gg \omega_s$, and they disappear when $\omega_s \to 0$. A clearer picture of these side bands is given by the rotating vector presentation of FIGURE 2.

It is important to remember that the signals $v_3(t)$ and $v_4(t)$, each composed of two component frequencies, exist on the separate lines 54 and 60, respectively. Consider $v_4(t)$ which consists of the principal side band $\omega_0 + \omega_s$ in superposition with the vestigial side band $\omega_0 - \omega_s$.

The composite signal is seen to have both phase and amplitude modulation, although the form is most atypical since $v_{4H}$, as the carrier, is being modulated by a small vector, $v_{4L}$, which turns at almost the same frequency as $V_{4H}$. Normally, the modulating frequency is much, much less than the carrier frequency.

If the signals of FIGURE 2 are shunt summed by a pair of equal resistances, the composite signal is $v_5(t)$

(29) $\qquad v_5(t) = \frac{1}{2}[v_3(t) + v_4(t)]$ or; more explicitly,

(30) $\quad v_5(t) = \frac{1}{4} MI\omega_0 [u_H(l+j) \sin (\omega_0+\omega_s)t + u_L(-l+j) \sin (\omega_0-\omega_s)t$ The form of Equation 30 is exactly like that of Equations 14 and 15, indicating that the R.C. networks 44–46 and 48–50 do not distort the resolver signals whatsoever. But it must be noted that the resolver signals are already distorted by an amplitude unbalance proportional to $\omega_s$ as denoted by the terms $u_H$ and $u_L$ in Equation 30. This unbalance is caused by generator action in the resolver modulator. The side bands composing Equation 30 are shown in FIGURE 3 with their amplitude differences grossly exaggerated.

The locus of $v_5(t)$ for pure suppressed-carrier modulation having symmetrical side bands would be a straight vertical line. Signal $v_5(t)$, which traces an ellipse, clearly has both amplitude and phase modulation, where the phase angle is referenced against the excitation current I sin $\omega_0 t$. A very important point to observe here is that the phase angle between the side bands remains unperturbed. This is not apparent in the picture of the separated side bands displayed in FIGURE 2.

Starting with Equations 1 and 2 and the constant velocity conditions, $\theta(t) = \omega_s t$, the development has led to the basic relation

(31) $\qquad \phi(t) = -2\theta(t) + \pi/2$

The quantity $\phi(t)$ is chosen as the term conveying shaft information. It is linear with $\theta(t)$ and contains the constant offset angle $\pi/2$. The factor 2 arises from the lag-lead configuration in FIGURE 1. The phase angle offset $\theta(t) = \pi/2$ is of no consequence since it may be removed at will by redefining shaft angle zero.

In the synthesis of an incremental system, the problem is to contrive a means for making a P pole resolver behave like a $2^n$P pole machine, where $n$ is a large integer. Mechanically stepping up the resolver shaft motion by a gear train must be ruled out, as this solution is old art known to be plagued with inertia, friction, and backlash. But a step-up operation may be performed electronically by a frequency multiplication based on the Fourier series expansion which may provide by analogy, a phantom step-up gear ratio. It is employed as shown in FIGURE 1.

It is seen in FIGURE 1 that the separated side bands, $\omega_0+\omega_s$ and $\omega_0-\omega_s$, are frequency multiplied by the same integer $2^{n-1}$ and then beat together in a beat frequency detector at 80 where the signal $v_6(t)$ is formed at frequency $2^n\omega_s$. The character of signal $v_6(t)$ is ideal suppressed-carrier modulation which could be taken from FIGURE 3 by balancing the side band amplitudes and speeding them up by the factor $2^{n-1}$. Amplitude unbalance in signal $v_5(t)$ is corrected in the side band multipliers by the process of clipping. What makes the multiplication by $2^n$ of the system input, $\theta=\omega_s t$, successful are the following two points:

(1) The side bands, $\omega_0+\omega_s$ and $\omega_0-\omega_s$, are separated. They exist uniquely at points 62 and 56.

(2) The side bands exist as large and essentially constant amplitudes.

The frequency multipliers 58 and 64 denoted in FIGURE 1 are identical units based on the method of harmonic selection in the Fourier series expansion. Ideally they must have a flat phase characteristic over the pass band, $2\omega_s$ maximum, in order to avoid positional errors in $\phi(t)$ due to $\omega_s$. This is shown in FIGURE 4 where the phase characteristic is not flat, but is a ramp.

The positional error $\Delta\phi$ is seen to exist only in the presence of a shaft velocity. When the shaft becomes static the side bands move into $\omega_0$, and the phase clock angle $\phi(\theta)$ is left unperturbed.

To recapitulate the proof of system fidelity, it was first demonstrated that the position and velocity information of the resolver shaft 10 are transmitted ideally in the term $\phi(t)$ of Equation 3 and FIGURE 3 regardless of side band amplitude unbalance. Then it was shown that when the side bands were processed by identical frequency multipliers of flat phase characteristics, an ideal suppressed carrier signal $v_6(t)$ could be synthesized at modulation frequency $2^n\omega_s$. The system is thus proved free from errors for the particular input, $\omega_s=$const., and the condition $\omega_s \ll \omega_0$. Now the question of system behavior for the generalized shaft input $\theta(t)$ must be considered. Equations 10 and 11 show that the angular shaft information appears directly upon the angle terms of the vector forcing functions which in turn act upon linear networks. In the presence of a shaft acceleration the forcing function could be simulated in the general form $$\sin(\omega_0 t + m \sin \omega_s)$$

which happens to be the basic form describing phase modulation. It expands into an infinite series of side bands with the aid of a Bessel function of the first kind. For small $m$, which is the case here, only the carrier $\omega_0$ and the first side band pair at frequencies $(\omega_0+\omega_s)$ and $(\omega_0-\omega_s)$ are significant. These frequencies are the self-same resolver frequencies resulting from shaft speeds between zero and $\omega_s$. The generalized input $\theta(t)$ will thus pass through the system undistorted.

Thus, an incremental system complete in detail, is delineated in FIGURE 1 where scaling is in binary form and a means for indicating absolute scale zero is provided.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In an incremental encoder system, the combination comprising a resolver transducer including a set of rotor windings and a set of stator windings in inductive relation, a source of a constant frequency alternating current for energizing one of the set of windings so as to induce a sinusoidal carrier wave of constant angular velocity in the other of said set of windings, a control shaft for angularly positioning the set of rotor windings in relation to the set of stator windings and at a variable angular velocity so that the angular velocity of the shaft may be superimposed upon the angular velocity of the sinusoidal carrier wave, a lag-lead phase shifter network connected across an output of the other set of windings, the lag-lead phase shifter network including first and second output means, the first output means providing a first side band sinusoidal signal wave of a frequency equivalent to a sum of the shaft velocity and carrier wave velocity, and the second output means providing a separated second side band sinusoidal signal wave of a frequency equivalent to a difference between the shaft velocity and the carrier wave velocity, a first frequency multiplier means operatively connected to said first output means so as to multiply the first side band signal by an integer, said first frequency multiplier means having a third output means to yield a first signal, a second frequency multiplier means operatively connected to said second output means so as to multiply the second side band signal by an identical integer, said second frequency multiplier means having a fourth output means to yield a second signal, and a beat frequency detector to combine the first and second signals so as to effect a count signal equivalent to the shaft velocity multiplied by twice said integer, and means to render said count signal into incremental form.

2. The combination defined by claim 1 including a second beat frequency detector, a phase shift network, means to apply one of said frequency multiplied signals through said phase shift network so as to effect a shift in an electrical phase thereof, means to apply the other of said frequency multiplied signals to said second beat frequency detector, said second beat frequency detector combining said phase shifted frequency multiplied signal with said other frequency multiplied signal to effect a second count signal which leads or lags the phase of the first mentioned count signal dependent upon the direction of angular movement of the control shaft, and means to render the second count signal into incremental form.

3. The combination defined by claim 1 including a first zero crossing detector operatively connected to the first output means, a second zero crossing detector operatively connected to the second output means, and a coincidence gate operated by said first and second zero crossing detectors and arranged to effect an output pulse defining a zero reference condition upon the first and second side band sinusoidal signal waves simultaneously passing through a zero crossing condition.

4. The combination defined by claim 2 including a first zero crossing detector operatively connected to the first output means, a second zero crossing detector operatively connected to the second output means, and a coincidence gate operated by said first and second zero crossing detectors and arranged to effect an output pulse defining a zero reference condition upon the first and second side band sinusoidal signal waves simultaneously passing through a zero crossing condition.

5. In an incremental encoder system, the combination comprising a resolver transducer including a set of rotor windings and a set of stator windings in inductive relation, a source of a constant frequency alternating current for energizing one of the set of windings so as to induce a sinusoidal carrier wave of constant angular velocity in the other of said set of windings, a control shaft for angularly positioning the set of rotor windings in relation to the set of stator windings and at a variable angular velocity so that the angular velocity of the shaft may be superimposed upon the angular velocity of the sinusoidal carrier wave, a lag-lead phase shifter network connected across an output of the other set of windings, the lag-lead phase shifter network including first and second output means, the first output means providing a first side band sinusoidal signal wave of a frequency equivalent to a sum of the shaft velocity and carrier wave velocity, and the second output means providing a separated second side band sinusoidal signal wave of a frequency equivalent to a difference between the shaft velocity and the carrier wave velocity, a first zero crossing detector operatively connected to the first output means, a second zero crossing detector operatively connected to the second output means, and a coincidence gate operated by said first and second zero crossing detectors and arranged to effect an output pulse defining a zero reference condition upon the first and second side band sinusoidal signal waves simultaneously passing through a zero crossing condition.

6. In an incremental encoder system, the combination comprising a resolver transducer including a set of rotor windings and a set of stator windings in inductive relation, a source of a constant frequency alternating current for energizing one of the set of windings so as to induce a sinusoidal carrier wave of constant angular velocity in the other of said set of windings, a control shaft for angularly positioning the set of rotor windings in relation to the set of stator windings and at a variable angular velocity so that the angular velocity of the shaft may be superimposed upon the angular velocity of the sinusoidal carrier wave, a lag-lead phase shifter network connected across an output of the other set of windings, the lag-lead phase shifter network including first and second output means, the first output means providing a first side band sinusoidal signal wave of a frequency equivalent to a sum of the shaft velocity and carrier wave velocity, and the second output means providing a separate second side band sinusoidal signal wave of a frequency equivalent to a difference between the shaft velocity and the carrier wave velocity, a first frequency multiplier means operatively connected to said first output means so as to multiply the first side band signal by an integer, said first frequency multiplier means having a third output means to yield a first signal, a second frequency multiplier means operatively connected to said second output means so as to multiply the second side band signal by an identical integer, said second frequency multipler means having a fourth output means to yield a second signal, a beat frequency detector, a phase shift network, means to apply one of said frequency multiplied signals through said phase shift network so as to effect a shift in an electrical phase thereof, means to apply the other of said frequency multiplied signals to said beat frequency detector, said beat frequency detector combining said phase shifted one frequency multiplied signal with said other frequency multiplied signal to effect a count signal, and means to render said count signal into incremental form.

7. In an incremental encoder system comprising a resolver transducer including a rotor having a pair of windings arranged in spaced quadrature, a stator having a pair of windings arranged in spaced quadrature, said pair of rotor and stator windings being variably inductively coupled, a source of a constant frequency alternating current for energizing a first pair of said windings so as to induce a sinusoidal carrier wave in a second pair of said windings, a shaft for angularly positioning the pair of rotor windings in relation to the pair of stator windings at a variable angular velocity so as to vary the inductive coupling between said rotor and stator windings and superimpose the angular velocity of the shaft upon the angular velocity of the sinusoidal carrier wave, a lag-lead phase shifter network connected across output conductors of said second pair of windings, the lag-lead phase shifter network including first and second output means, frequency multiplier means operatively connected to said first and second output means to provide a pair of signals, and means to combine said signals so as to effect a count signal having a frequency equivalent to an integer multiple of the velocity of rotation of said shaft.

8. The combination comprising a transducer, means for providing a sinusoidal carrier wave of constant angular velocity for energizing said transducer, first and second outputs for said transducer, a shaft angularly movable for adjusting said transducer, said shaft being movable at a variable angular velocity, said transducer including first means operative by said shaft to superimpose the angular velocity of the shaft upon the angular velocity of said sinusoidal carrier wave, and second means operatively connected to said first means for effecting at said first output a first side band sinusoidal signal wave of a frequency equivalent to a sum of the shaft velocity and carrier wave velocity and at said second output a second side band sinusoidal signal wave of a frequency equivalent to a difference between the shaft velocity and the carrier wave velocity, means operatively connected to said first and second outputs to multiply the frequency of said first and second side band signal waves by an identical integer and provide a pair of output signal waves, and a beat frequency detector means to combine said output signal waves so as to effect a count signal wave having a frequency equivalent to a product of the angular velocity of the shaft multiplied by twice said integer.

9. The combination comprising a transducer, means for providing a sinusoidal carrier wave of constant angular velocity for energizing said transducer, first and second outputs for said transducer, a shaft angularly movable for adjusting said transducer, said shaft being movable at a variable angular velocity, said transducer including first means operative by said shaft to superimpose the angular velocity of the shaft upon the angular velocity of said sinusoidal carrier wave, and second means operatively connected to said first means for effecting at said first output a first side band sinusoidal signal wave of a frequency equivalent to a sum of the shaft velocity and carrier wave velocity and at said second output a second side band sinusoidal signal wave of a frequency equivalent to a difference between the shaft velocity and the carrier wave velocity, a first frequency multiplier means operatively connected to said first output to multiply the frequency of said first side band signal wave by an integer and provide an output signal wave of a frequency equivalent to the frequency of the first side band signal wave multiplied by said integer, a second frequency multiplier means operatively connected to said second output to multiply the frequency of said second side band signal wave by an identical integer and provide an output signal wave of a frequency equivalent to the frequency of the second side band signal wave multiplied by said integer, and a beat frequency detector means to combine said frequency multiplied signal waves so as to effect an output count signal wave having a frequency equivalent to a product of the angular velocity of the shaft multiplied by twice said integer.

10. The combination comprising a transducer, means for providing a sinusoidal carrier wave of constant angular velocity for energizing said transducer, first and second outputs for said transducer, a shaft angularly movable in opposite senses for adjusting said transducer, said shaft being movable at a variable angular velocity, said transducer including first means operative by said shaft to superimpose the angular velocity of the shaft upon the angular velocity of said sinusoidal carrier wave, and second means operatively connected to said first means for effecting at said first output a first side band sinusoidal signal wave of a frequency equivalent to a sum of the shaft velocity and carrier wave velocity and at said second output a second side band sinusoidal signal wave of a frequency equivalent to a difference between the shaft velocity and the carrier wave velocity, a first frequency multiplier means operatively connected to said first output to multiply the frequency of said first side band signal wave by an integer and provide an output signal wave of a frequency equivalent to the frequency of the first side band signal wave multiplied by said integer, a second frequency multiplier means operatively connected to said second output to multiply the frequency of said second side band signal wave by an identical integer and provide an output signal wave of a frequency equivalent to the frequency of the second side band signal wave multiplied by said integer, a first beat frequency detector means operatively connected to said output signal waves to combine said signal waves so as to effect a first output count signal wave having a frequency equivalent to a product of the angular velocity of the shaft multiplied by twice said integer, a phase shift network, a second beat frequency detector means, said phase shift network being operatively connected between the output signal wave of one of said frequency multiplier means and the second beat frequency detector means so as to shift the phase of the output signal wave supplied by said one frequency multiplier means to said second beat frequency detector means through said phase shift network, said second beat frequency detector means being operatively connected to said output signal wave from the other of said frequency multiplier means so as to combine the phase shifted frequency multiplied output signal wave supplied through said phase shift network with the frequency multiplied output signal wave supplied by the other of said frequency multiplier means to effect a second output count signal wave of a phase which may selectively lead or lag the phase of the first output count signal wave dependent upon the sense of the angular movement of the shaft.

References Cited

UNITED STATES PATENTS

| | | | |
|---|---|---|---|
| 2,980,900 | 6/1961 | Rabin | 340—347 |
| 3,023,959 | 3/1962 | Rabin | 340—347 |
| 3,071,324 | 1/1963 | Schroeder | 340—347 |
| 3,092,718 | 6/1963 | Wullert | 340—347 |
| 3,099,002 | 7/1963 | Spaulding et al. | 340—347 |
| 3,099,003 | 7/1963 | Spaulding et al. | 340—347 |
| 3,191,010 | 6/1965 | Tripp et al. | 340—347 |
| 3,226,710 | 12/1965 | Tripp | 340—347 |
| 3,277,461 | 10/1966 | Selvin | 340—347 |
| 3,315,253 | 4/1967 | Geller | 340—347 |

DARYL W. COOK, *Acting Primary Examiner.*

W. J. KOPACZ, *Assistant Examiner.*